C. R. DUGDALE & D. BREED.
Plow.

No. 160,086. Patented Feb. 23, 1875

Witnesses:
Geo. H. Graham.
W. E. Chaffee.

Inventors.
Charles R. Dugdale
Daniel Breed
Joint Inventor & Atty.

THE GRAPHIC CO.PHOTO-LITH.39 & 41 PARK PLACE,N.Y.

UNITED STATES PATENT OFFICE.

CHARLES R. DUGDALE, OF MASON AND DIXON, PENNSYLVANIA, AND DANIEL BREED, OF WASHINGTON, DISTRICT OF COLUMBIA.

IMPROVEMENT IN PLOWS.

Specification forming part of Letters Patent No. 160,086, dated February 23, 1875; application filed September 22, 1874.

*To all whom it may concern:*

Be it known that we, CHARLES R. DUGDALE, of Mason and Dixon, Franklin county, Pennsylvania, and DANIEL BREED, of Washington, in the District of Columbia, have invented an Improvement in Plows, of which the following is a specification:

Our invention relates to the mode of enameling plows with porcelain; and consists chiefly of a corrugated land-side or waved surface for receiving the porcelain enamel; and, secondly, of similar corrugations on otherwise flat surfaces of the point and mold-board, as heretofore usually made.

As plows are subject to strain and jar, the porcelain enamel is liable to crack, and, in fact, the cooling process often destroys the perfection and efficiency of the enamel; and our improvement is designed to remedy these difficulties by making the plow with a waved surface on the land-side and other surfaces usually flat, or nearly so.

Figure 1:
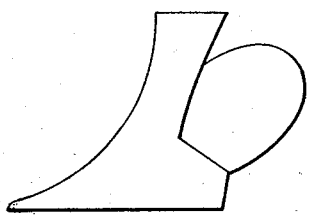
Figure 2:
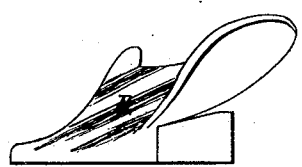
Figure 3:
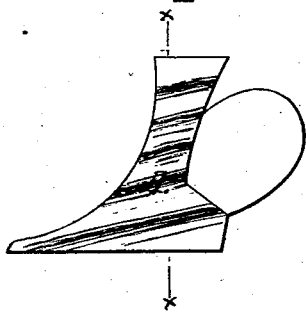
Figure 4:

In the accompanying drawings, Figure 1 represents a plow with the land-side perfectly smooth and flat, as usually made. Fig. 3 represents the land-side with a waved surface. Fig. 4 represents a vertical section through the same, showing the waves on the right hand. Fig. 2 is a top view, showing corrugations on the point and mold-board.

In the application of our improvement to plows, we propose to make the entire wearing-surface of the plow more or less curved, so that the cooling of the iron will not crack the porcelain enamel. We propose to wave the land-side, as seen at A, Fig. 3, and the point and mold-board as shown at B, Fig. 2. These waves A on the land-side dip a little in front, so as to have the tendency to keep the plow in the furrow, and the waves on the point should run outward as they run backward, thus following the track of the furrow in traveling over the point and mold-board.

Having described our invention, we claim—

1. A plow having its land-side, point, and mold-board made with corrugated or waved surfaces, and covered with enamel or porcelain, substantially as set forth.

2. A plow made with corrugated or waved surfaces, for the purpose of applying enamel, substantially as set forth.

CHARLES R. DUGDALE.
DANIEL BREED.

Witnesses:
E. C. WEAVER,
J. S. BROWN.